Aug. 11, 1953
E. C. CORK
RESONANT AERIAL
Filed Sept. 24, 1947
2,648,771
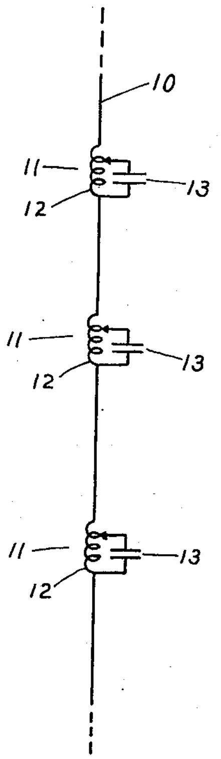
INVENTOR:
EDWARD CECIL CORK
BY Ralph E. Atherton
ATTORNEY Patented Aug. 11, 1953

2,648,771

UNITED STATES PATENT OFFICE 2,648,771

RESONANT AERIAL

Edward Cecil Cork, Ealing, London, England, assignor to Electric & Musical Industries Limited, Hayes, England, a company of Great Britain Application September 24, 1947, Serial No. 775,784
In Great Britain October 1, 1946

6 Claims. (Cl. 250—33)

The present invention relates to resonant transmitting or receiving aerials and has for its object to provide an aerial capable of resonating in more than one band of frequencies.

According to the invention, there is provided an aerial comprising a conductor loaded by a plurality of reactive elements arranged in series along the length of said conductor so that it can operate in a resonant manner in more than one band of frequencies, said elements being disposed along the length of said conductor at intervals which at the highest of said frequency bands are short compared with the wavelength in said highest frequency band and said elements having magnitudes so proportioned that the same length of said conductor can resonate like a vibrator having a length equal to a number of quarter wavelengths, said number including one, corresponding to each of said plurality of different bands.

If desired, said reactive elements may be so chosen that they assume substantially zero impedance at one of said frequencies, that is to say, may be series resonant at that frequency so that the aerial resonates effectively as an unloaded conductor.

Reference may be made at this point to page 854 of the Radio Engineers' Handbook by Frederick Emmons Terman, published by McGraw-Hill Book Company Inc. of New York and London, where a multi-frequency-tuned antenna system is disclosed in which a dipole has a length $a^1$, equal to a half wavelength at the highest frequency to be transmitted, and parallel resonant circuits are added to the ends of the section $a^1$ such circuits being resonant at the frequency for which the length $a^1$ is a half wavelength. Operation at the next lower frequency is obtained by adding lengths of conductor $b$ and $b^1$ so that the section $a^2$ which is then formed has an equivalent electrical length, taking into consideration the reactance introduced by the parallel resonant circuits, corresponding to half wavelength resonance for the next lower frequency. The added lengths $b$ and $b^1$ are inoperative for the frequency for which the section $a^1$ is in half-wave resonance since they are isolated by the high impedance then presented by the parallel resonant circuits. Additional resonant frequencies can be introduced in a similar manner.

The present invention distinguishes from this prior proposal in that at the highest frequency the reactive elements are disposed apart at distances short compared with the wavelength at said frequency, whereas in the prior proposal the section $a^1$ is not loaded with reactive elements and, moreover, the same length of the aerial is not resonant at a plurality of different frequencies since the section $a^2$ is resonant at a lower frequency, whereas only the section $a^1$ is resonant at the highest frequency. With the present invention, the same length of the conductor is resonant at a plurality of different frequencies. Thus, substantially, the whole length of the conductor is active at all times with the result that there is a considerable narrowing of the directive characteristic or diagram of the aerial and the gain of the aerial exceeds that of a dipole.

In order that the said invention may be clearly understood and readily carried into effect it will now be more fully described with reference to the figure of the accompanying drawing.

Referring to this figure, numeral 10 indicates said conductor which is interrupted at intervals along its length by at least three reactive loading elements 11, and is adapted to operate in resonant manner at two different frequency bands. For convenience only a portion of the conductor 10 is shown in the figure. The reactive loading elements 11 each comprises an inductance 12 which is in series connection with the conductor 10 and a capacity 13 shunted across the inductance 12. Said loading elements are disposed along the conductor 10 at intervals short compared with the wavelength in the band of higher frequency at which said aerial is to operate. Said inductances 12 and capacities 13 and the total length of said conductor 10 are so chosen that at the lower of said frequency bands said conductor is effectively inductively loaded and resonant in said band, while at the higher of said frequency bands said conductor is effectively capacitatively loaded and resonant in said band. For this purpose, each of said elements 11 is tuned to substantially the same frequency. Since the aerial in accordance with the invention is a resonant aerial, the loading elements must simulate a continuous loading and as stated above they are disposed at intervals short compared with the wavelength which for continuous loading must be less than a quarter of a wavelength and preferably one-tenth or one-twelfth of a wavelength.

The invention thus provides an aerial capable of resonating in two different frequency bands. The invention can also be applied for providing an aerial capable of resonating in more than two frequency bands. This may be achieved by appropriate design of the loading elements.

For example, the capacities 13 may be shunted across only a part of the inductances 12, as shown, so that each capacity 13 together with the shunted portion of the associated inductance resonates with the inductance effectively in series with it so that each element possesses substantially zero impedance between its terminals whereby the aerial conductor is effectively unbroken by the loading elements. In this case, the aerial resonates not only at the frequencies at which the elements 11 provide effective inductive and capacitative loading as aforesaid but also at the frequency dictated by its natural length.

It will be appreciated that the elements 11 are capable of anti-resonance at a particular frequency in which case the portions of conductor 10 between the elements become isolated from one another and by suitably choosing the length of said portions of conductor the latter may be arranged to resonate at the frequency of anti-resonance of the elements 11 as individual dipoles.

The invention is particularly applicable to dipoles but can, if desired, be applied to unipoles or quarter-wave aerials.

What I claim is:

1. An aerial comprising a conductor loaded by at least three reactive elements arranged in series along the length of said conductor so that it can operate in a resonant manner in more than one band of frequencies, each series reactive element comprising an inductance shunted by a capacity, said elements being disposed along the length of said conductor at intervals which at the highest of said frequency bands are short compared with the wavelength in said band and said elements each being tuned to substantially the same frequency and having magnitudes which are such that the same length of said conductor can resonate like a vibrator having a length equal to a number of quarter wavelengths, said number including one, corresponding to each of said plurality of different bands.

2. An aerial according to claim 1, wherein said reactive elements each includes a further inductance in series with its capacity, said elements having magnitudes proportioned to present substantially zero impedance at one of said frequency bands so that the aerial resonates effectively as an unloaded conductor.

3. An aerial comprising a conductor loaded by at least three reactive elements arranged in series along the length of said conductor to operate in a resonant manner in more than one band of frequencies, said elements being disposed along the length of said conductor at short intervals compared with the wavelength in the highest of said frequency bands and said elements each being tuned to substantially the same frequency and having magnitudes proportioned to provide effective capacitive loading in one of said bands and effective inductive loading in another of said bands, whereby the same length of said conductor resonates like a vibrator having a length equal to a number of quarter wavelengths, said number including one, corresponding to each of said plurality of different bands, said reactive elements each comprising an inductance shunted by a capacity and having a further inductance in series with its capacity, and the magnitudes of said elements being proportioned to present substantially zero impedance at one of said frequency bands, whereby the aerial resonates effectively as an unloaded conductor.

4. An aerial comprising a conductor loaded by at least three reactive elements arranged in series along the length of said conductor to operate in a resonant manner in two frequency bands, said elements each including an inductance shunted by a capacity and being disposed along the length of said conductor at short intervals compared with the wavelength in the highest of said frequency bands, all of said elements being tuned to present individually in both of said bands a reactive impedance, said reactive impedance being effectively capacitive in one of said bands and effectively inductive in the other of said bands, whereby the same length of said conductor can resonate like a vibrator having a length equal to a number of quarter wavelengths, said number including one, corresponding to each of said two frequency bands.

5. An aerial comprising a conductor loaded by at least three reactive elements arranged in series along the length of said conductor to operate in a resonant manner in two frequency bands, said elements each including an inductance shunted by a capacity, and said elements being disposed at intervals along the length of said conductor which are less than a quarter of a wavelength in the highest of said frequency bands, and said elements being tuned to present in one of said bands effective capacitive loading and in the other of said bands effective inductive loading, whereby the same length of said conductor can resonate like a vibrator having a length equal to a number of quarter wavelengths, said number including one, corresponding to each of said two frequency bands.

6. An aerial comprising a conductor loaded by at least three reactive elements arranged in series along the length of said conductor to operate in a resonant manner in two frequency bands, said elements each including an inductance shunted by a capacity, said elements being disposed at intervals along the length of said conductor which are less than a quarter of a wavelength in the highest of said frequency bands, and said elements being tuned to substantially the same frequency to present in one of said bands effective capacitive loading and in the other of said bands effective inductive loading, whereby the same length of said conductor can resonate like a vibrator having a length equal to a number of quarter wavelengths, said number including one, corresponding to each of said two frequency bands.

EDWARD CECIL CORK.

References Cited in the file of this patent

UNITED STATES PATENTS

| Number | Name | Date |
|---|---|---|
| 1,295,245 | Weagant et al. | Feb. 25, 1919 |
| 1,783,025 | Meissner | Nov. 25, 1930 |
| 2,229,865 | Morgan | Jan. 28, 1941 |
| 2,243,182 | Amy et al. | May 27, 1941 |
| 2,282,292 | Amy | May 5, 1942 |
| 2,380,333 | Sheldorf | July 10, 1945 |